United States Patent [19]

Yamashita et al.

[11] Patent Number: 4,937,857
[45] Date of Patent: Jun. 26, 1990

[54] PLURAL TERMINALS COMMUNICATION CONTROLLING SYSTEM

[75] Inventors: Tetsuro Yamashita, Kawasaki; Toshiaki Satoh; Kiyoshi Miyasoh, both of Hino, all of Japan

[73] Assignee: Fuji Electric Co., Ltd., Kawasaki, Japan

[21] Appl. No.: 291,291

[22] Filed: Dec. 28, 1988

[30] Foreign Application Priority Data

Dec. 29, 1987 [JP] Japan ................................. 62-335381
Mar. 22, 1988 [JP] Japan ................................. 63-67716

[51] Int. Cl.⁵ ...................... H04M 1/64; H04M 11/00
[52] U.S. Cl. .................................. 379/210; 379/93; 379/100
[58] Field of Search .................. 379/100, 67, 93, 210, 379/94

[56] References Cited

U.S. PATENT DOCUMENTS 4,677,660 6/1987 Yoshida ............................. 379/100
4,794,637 12/1988 Hashimoto .......................... 379/67

FOREIGN PATENT DOCUMENTS 0138155 8/1983 Japan ................................. 379/100
0169265 9/1984 Japan ................................. 379/100
2156187 10/1985 United Kingdom .
8601666 3/1986 World Int. Prop. O. .

Primary Examiner—Thomas W. Brown
Attorney, Agent, or Firm—Spencer & Frank

[57] ABSTRACT

A plurality of communication terminals are coupled to one telephone line via a plural terminals communication controlling system having circuits for detecting on-hook/off-hook of the communication terminals and a time supervising circuit. In the case where a transmission side has no selection signal transmission function, a first communication terminal is called by the transmission side. Even if this first communication terminal is a telephone set and there is no response because of the absence of a called party, a second communication terminal is called after a predetermined period of time, so that a desired communication is established between the transmission side and the second communication terminal by using a facsimile as the second communication terminal.

4 Claims, 4 Drawing Sheets

PLURAL TERMINALS COMMUNICATION CONTROLLING SYSTEM

BACKGROUND OF THE INVENTION

1. Field of the Invention

The present invention relates to a plural terminals communication controlling system which accommodates a plurality of communication terminals into a single communication line by using an additional device having one central office line terminal connected to the communication line and a plurality of communication terminal connecting terminals connected to communication terminals. This system is capable of connecting with a predetermined communication terminal even if a transmission side has no means for transmitting a selection signal specifying a communication terminal, and is also capable of connecting with the other predetermined communication terminal even if this predetermined communication terminal does not respond or is an automatically answering telephone set.

2. Description of the Prior Art

FIG. 1 shows a plural terminals communication controlling system of a conventional type which calls a communication terminal specified by the transmission side by connecting a single telephone line with plural communication terminals. In FIG. 1, reference numeral 1 represents a telephone exchanger; 2, a plural terminals communication controlling system; 3a and 3b, telephone sets; 4a and 4b, facsimiles; 5a and 5b, data terminals; 11 and 12, telephone lines; T1, a telephone line connecting terminal and T2 (T2a-T2c), communication terminal connecting terminals. This plural terminals communication controlling system 2 comprises a ringing signal detecting circuit 22a, a loop closing circuit 22b, a selection signal receiving circuit 22c, a connecting switch changing circuit 23, connection switches 26 (26a-26c), a ringing signal transmitting circuit 27, response detecting circuits 29 (29a-29c), and a control circuit 21.

This system is so constructed that a ringing signal is transmitted from the telephone exchanger 1 in response to a signal originating from the data terminal 5b. The ringing signal detecting circuit 22a detects a ringing signal. Then, the control circuit 21 receives a signal from the ringing signal detecting circuit 22a and actuates the loop closing circuit 22b to establish a communication line between the plural terminals communication controlling system 2 and the data terminal 5b. Next, the selection signal receiving circuit 22c detects a selection signal from the data terminal 5b for connecting with the data terminal 5a coupled with the communication terminal connecting terminal T2c, and in response to the selection signal, the control circuit 21 closes the connection switch 26c to the side of the ringing signal transmitting circuit 27. The ringing signal transmitting circuit 27 is operated to transmit the ringing signal. Then, when the response detecting circuit 29c detects a response from the data terminal 5a responding to this ringing signal, the transmission of the ringing signal is stopped by stopping the operation of the ringing signal transmitting circuit 27 and the connecting switch 26c is closed to the side of the telephone line 11 so that communication between the data terminal 5a and the data terminal 5b is established.

Normally, the purpose of a call incoming to the above system made by an ordinary telephone subscriber is a "telephone conversation". In this case, most likely, the telephone subscriber has no knowledge about the transmitting method of the selection signal for calling the telephone set and therefore, no selection signal is received by the above system. In order to prevent deterioration of the service to the ordinary telephone subscribers, the control circuit 21 supervises whether or not the selection signal specifying a communication terminal is detected within a predetermined period of time and calls the telephone set 3a when the selection signal is not detected.

In such construction, the telephone set is called when the selection signal is not detected within the predetermined period of time. That is, in the case where a terminal on the transmission side is for example, a facsimile machine having no selection signal transmitting circuit, though it is required to call the facsimile connected with the additional device, the selection signal specifying a communication terminal is not detected by the selection signal receiving circuit and, therefore, the telephone set is called. This creates a problem of the incapability of communication with the facsimile.

Like a facsimile machine, this problem is extremely important in the case where the transmission side has no selection signal transmitting circuit for specifying a communication terminal.

SUMMARY OF THE INVENTION

In order to solve the problem as described above, an object of the present invention is to provide a plural terminals communication controlling system in which connection with a desired communication terminal is made, even if the transmission side has no selection signal transmitting function for specifying the communication terminal and which immediately disconnects the line when the communication with the desired communication terminal is completed.

According to the present invention, a plural terminals communication system is provided which operates as follows. When transmission side has no selection signal transmitting circuit, unlike facsimile, for example, a first communication terminal is called by the transmission side. A second communication terminal is also called by the transmission side after a lapse of a predetermined period of time if the first communication terminal is, for example, a telephone set, which makes no response because of the absence of a called party. Thus, the desired communication is carried out between the transmission side and the second communication terminal, even if a called party is absent, by using a facsimile as the second communication terminal. If the first communication terminal is an automatically answering telephone set, there is a response, even if the called party is absent. In this case, the desired communication is carried out in a similar manner by calling the second communication terminal after detecting on-hook of this automatically answering telephone set. Furthermore, according to the system thus constructed, in accordance with the response from the telephone set to the first communication terminal, the second communication terminal is called by detecting on-hook of the telephone set. This automatic second communication terminal call can be prevented by a predetermined dialing before the on-hook of the telephone set in order to immediately disconnect the line.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
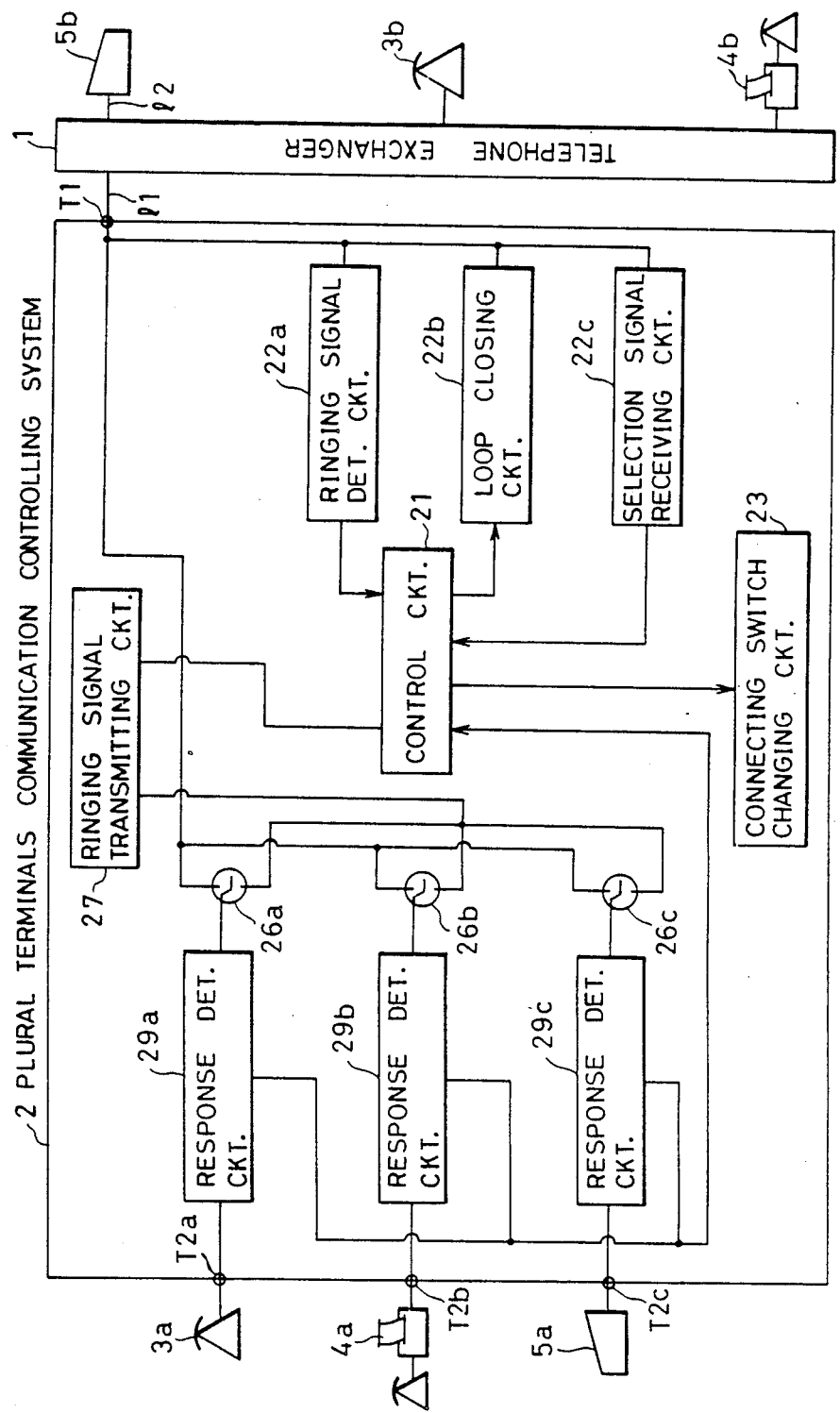
FIG. 1 is a block diagram showing an example of a conventional system.
Figure 2:
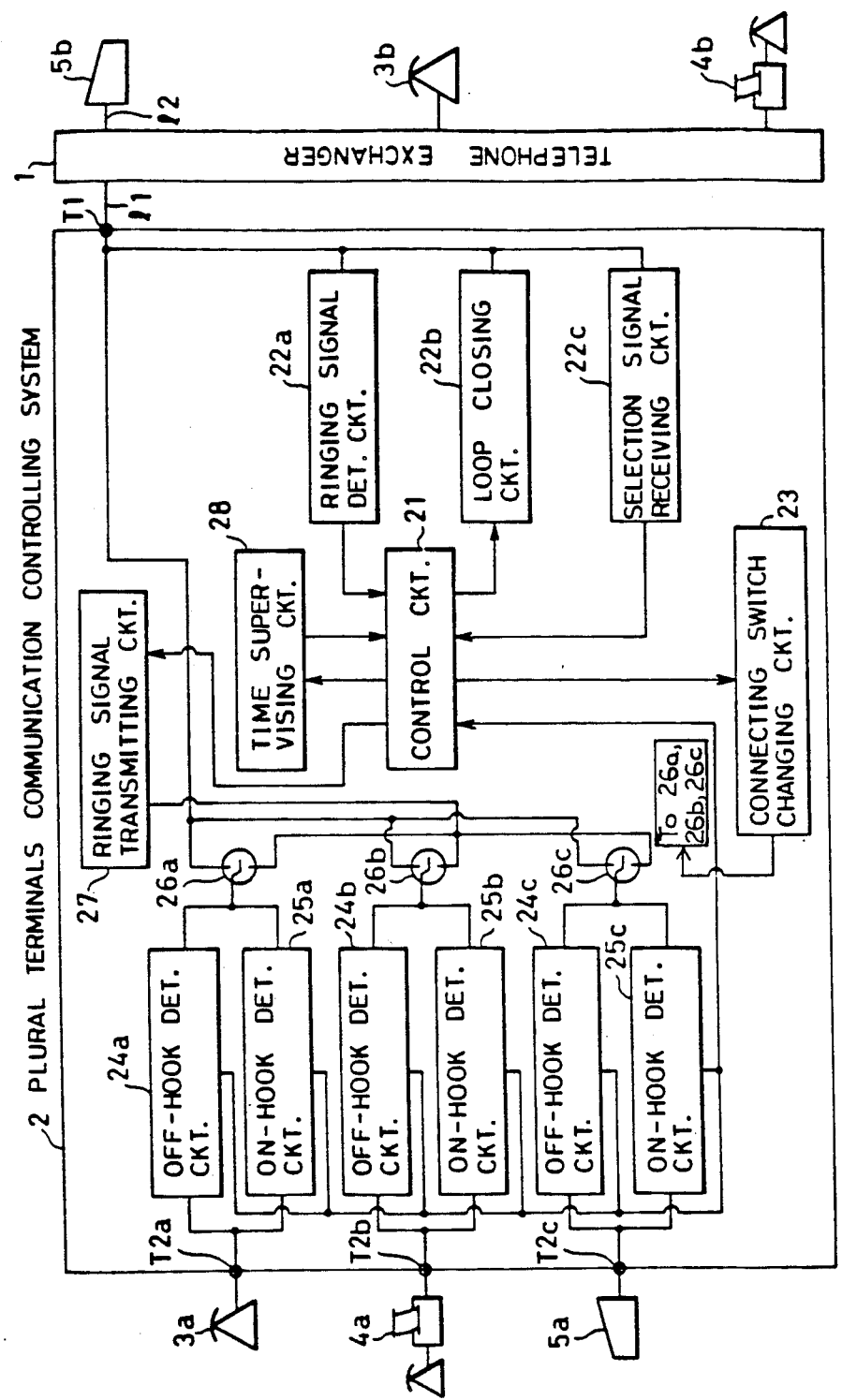
FIG. 2 is a block diagram showing one embodiment of a plural terminals communication controlling system according to the present invention.

FIG. 2 shows one embodiment of a plural terminals communication controlling system according to the present invention. In FIG. 2, reference numeral 1 designates a telephone exchanger; 2, a plural terminals communication controlling system; 3a and 3b, telephone sets; 4a and 4b, facsimiles; and 5a and 5b, data terminals. 11 and 12 denote telephone lines; T1, a telephone line connecting terminal; and T2 (T2a-T2c), communication terminal connecting terminals. The plural terminals communication controlling system 2 comprises a control circuit 21, a ringing signal detecting circuit 22a, a loop closing circuit 22b, a selection signal receiving circuit 22c, a connecting switch changing circuit 23, an off-hook detecting circuit 24 (24a-24c), an on-hook detecting circuit 25 (25a-25c), a connecting switch 26 (26a-26c), a ringing signal transmitting circuit 27 and a time supervising circuit 28.

Figure 3A:
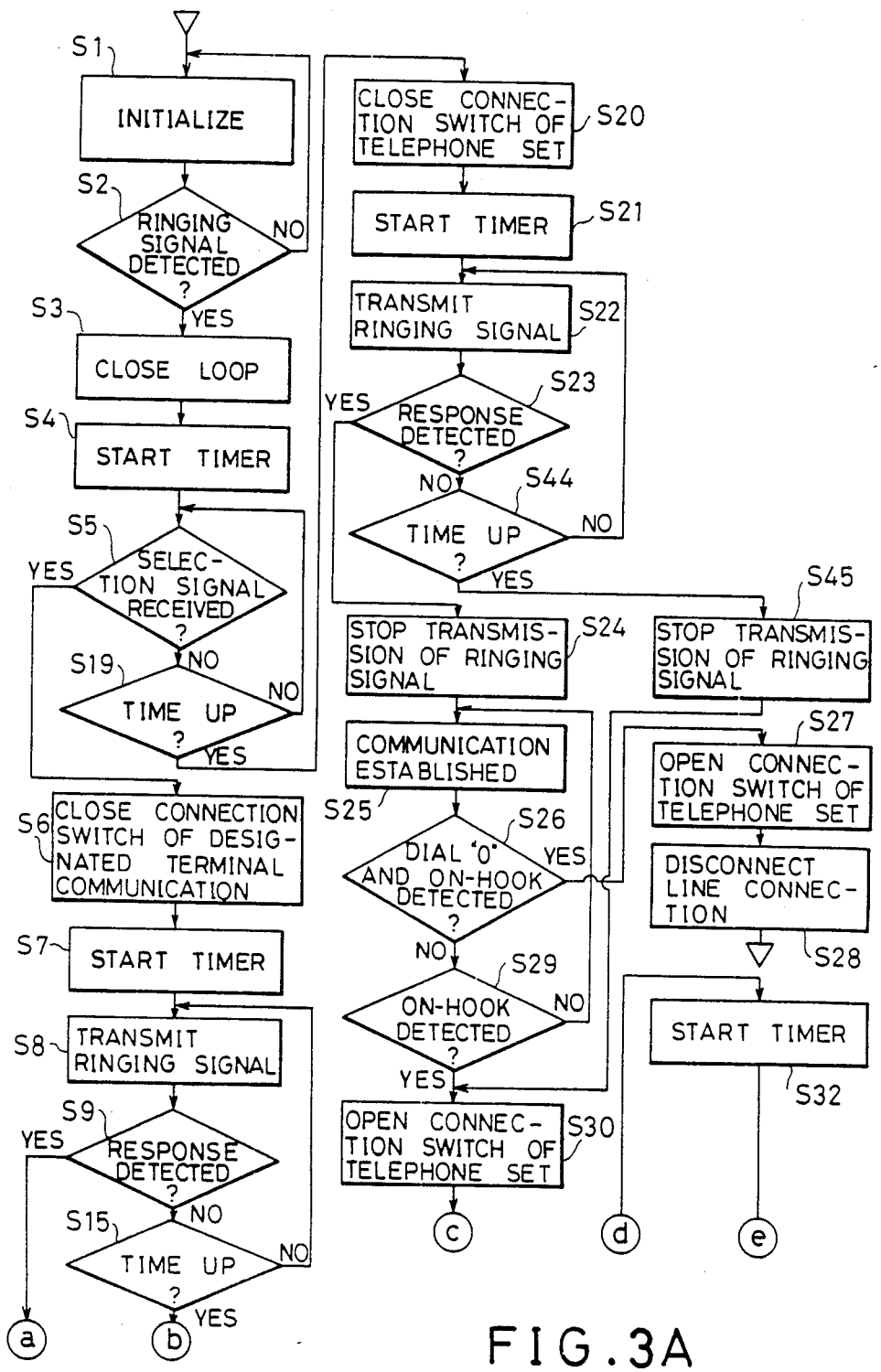
FIGS. 3A and 3B are flowcharts showing an example of a control procedure program used in the embodiment of the present invention shown in FIG. 2.
Figure 3B:
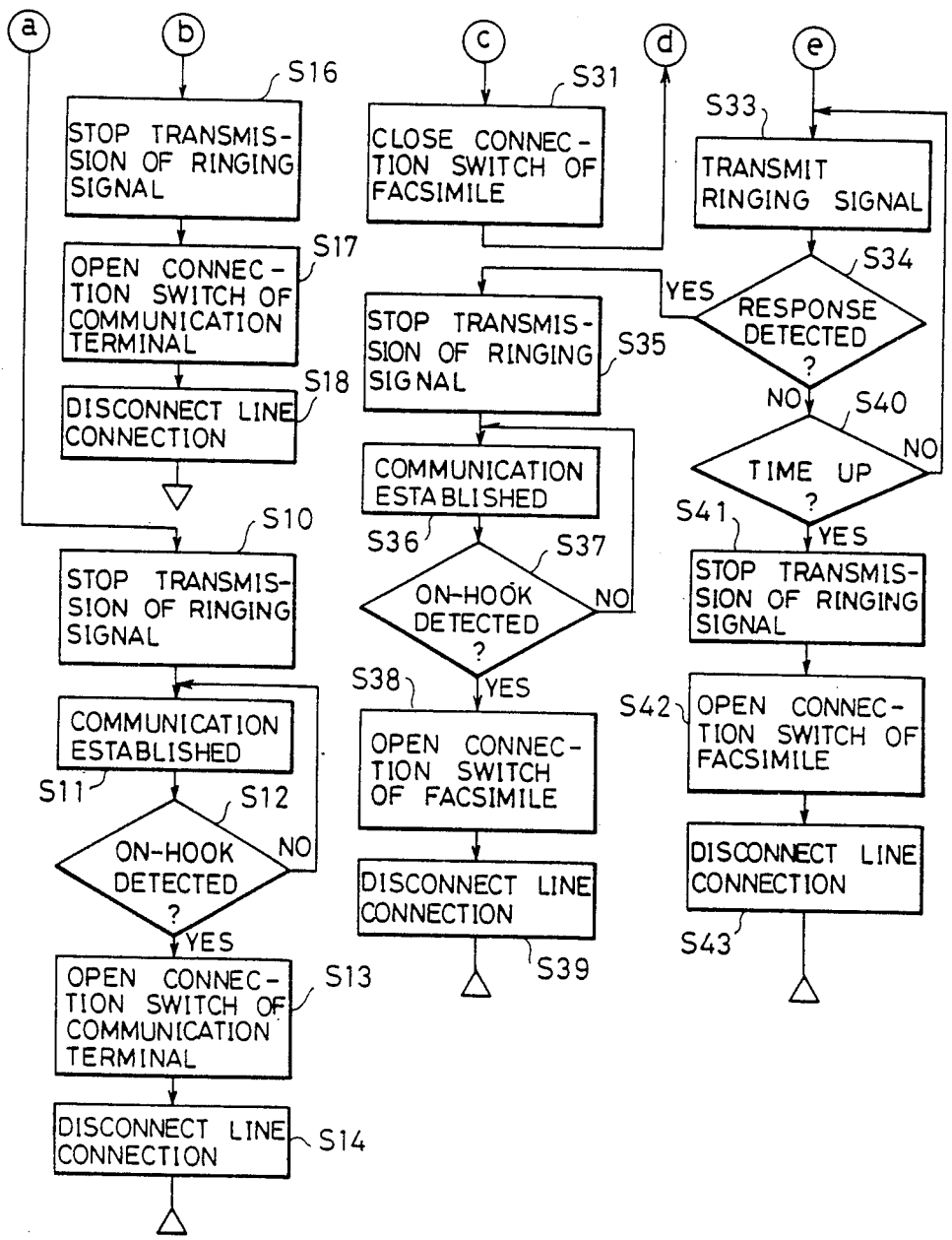

FIGS. 3A and 3B are flowcharts showing an example of a program stored in the control circuit of the plural terminals communication controlling system 2 according to the present invention.

The present invention will now be described below with reference to FIGS. 2, 3A and 3B.

First, there will be described a case where the transmission side has a transmission circuit for transmitting the selection signal for specifying a communication terminal. Operations which start when the selection signal is received by the system 2 will be described below.

In an initializing step S1, when the data terminal 5b starts its transmission, a ringing signal is supplied to the plural terminals communication controlling system 2 from the telephone exchanger 1. When the ringing signal detecting circuit 22a detects this ringing signal (in step S2), the control circuit 21 actuates the loop closing circuit 22b to close a loop in response to the signal from the ringing signal detecting circuit 22a (in step S3), establishing a communication line between the plural terminals communication controlling system 2 and the data terminal 5b. Then, a first timer in the time supervising circuit 28 is started by this loop closing (in step S4). The first timer sets a time to supervise whether or not the selection signal for specifying the communication terminal is transmitted from the transmission side. When the selection signal receiving circuit 22c detects the selection signal specifying the data terminal 5a connected with the communication terminal connecting terminal T2c transmitted from the data terminal 5b before a lapse of the time set in the first timer (in step S5), upon receipt of the signal from the selection signal receiving circuit 22c, the control circuit 21 resets the first timer and supplies instructions to the connecting switch changing circuit 23 to close the connection switch 26c to the side of the ringing signal transmitting circuit 27 (in step S6).

Next, a second timer in the time supervising circuit 28 is started (in step S7) and the ringing signal is supplied to the data terminal 5a by operating the ringing signal transmitting circuit 27 (in step S8). The second timer sets a time for supervising whether or not a called communication terminal responds. When the off-hook detecting circuit 24c detects a response from the data terminal 5a before a lapse of the time set in the second timer (in step S9), the control circuit 21 resets the second timer and stops the operation of the ringing signal transmitting circuit 27 upon receipt of the signal from the off-hook detecting circuit 24c (in step S10).

Then, the control circuit 21 supplies instructions to the connecting switch changing circuit 23 to connect the connection switch 26c with the side of the telephone line 11, so that communication is established through the line 11 or the line 11 is rendered busy (in step S11). When the on-hook detecting circuit 25c detects on-hook after termination of the communication between the data terminals 5a and 5b, the control circuit 21 supplies, in response to the signal from the on-hook detecting circuit 25c, instructions to the connecting switch changing circuit 23 to open the connection switch 26c, thereby releasing connection of the data terminal 5a with the telephone line 11 (in step S13). Then, the control circuit 21 supplies instructions to the loop closing circuit 22b to open a loop, thereby disconnecting the line connection between the plural terminals communication control system 2 and the telephone line 11 (in step S14).

Thus, communication with the communication terminal specified by the transmission side can be performed by detecting the selection signal. In the case where there is no response from the communication terminal specified by the selection signal, when the time supervising circuit 28 detects a lapse of the time set in the second timer (in step S15), the control circuit 21 stops, in response to the signal from the time supervising circuit 28, the operation of the ringing signal transmitting circuit 27 to stop the ringing signal transmission (in step S16), supplies instructions to the connecting switch changing circuit 23 to open the connection switch 26c, thereby releasing connection between the data terminal 5a and the ringing signal transmitting circuit 27 (in step S17), and supplies instructions to the loop closing circuit 22b to release the loop, thereby disconnecting the line connection between the plural terminals communication controlling system 2 and the telephone line 11 (in step S18).

The above description of operations applies to the case where the transmission side has the selection signal transmitting circuit.

There will now be described operations in the case where the transmitting side has no selection signal transmitting circuit and the selection signal cannot be received.

In such case, when the time supervising circuit 28 detects a lapse of the time set in the first timer (in step S19), the control circuit 21 supplies, in response to the signal from the time supervising circuit 28, instructions to the connecting switch changing circuit 23 to close the connection switch 26a of a previously specified communication terminal (for example, the telephone set 3a) to the side of the ringing signal transmitting circuit 27 (in step S20). The connection switch of the communication terminal to be closed is registered in advance in the control circuit 21 by a user.

Subsequently, a third timer in the time supervising circuit 28 is started (in step S21) and the ringing signal transmitting circuit 27 is actuated to transmit the ringing signal to the telephone set 3a (in step S22). The third timer sets a time for supervising whether the communication terminal (in this case, the telephone set 3a) responds or not and is commonly usable with the second timer. When the off-hook detecting circuit 24a detects a response of the telephone set 3a before a lapse of the time set in the third timer (in step S23), the control circuit 21 resets the third timer and stops the operation of the ringing signal transmitting circuit 27 (in step S24) upon receipt of the signal from this off-hook detecting circuit 24a.

Then, the control circuit 21 supplies instructions to the connecting switch changing circuit 23 to connect the connection switch 26a with the side of the telephone line 11 so that communication is established through the line 11 or the line 11 is rendered busy (in step S25). When the on-hook detecting circuit 25a detects on-hook after dialing a predetermined number such as "0" (in step S26), after completion of the communication, the control circuit 21 receives the signal from the on-hook detecting circuit 25a and supplies instructions to the connecting switch changing circuit 23 to open the connection switch 26a, thereby releasing connection between the telephone set 3a and the telephone line 11 (in step S27). The control circuit 21 also supplies instructions to the loop closing circuit 22b to open a loop, thereby disconnecting the line connection between the plural terminals communication controlling system 2 and the telephone line 11 (in step S28). Thus, all operations have been completed in the case where the desired communication terminal of the transmission side is the telephone set 3a.

The foregoing descriptions relate to the operations in the case where the selection signal cannot be received and the telephone set 3a is called as a previously specified communication terminal. Next, there will be described operations in the case where the desired communication terminal is not the telephone set 3a.

In the case where the desired terminal is, for instance, the facsimile 4a, a person who responds to the telephone set 3a is required to connect the telephone line 11 with the facsimile 4a. That is, the on-hook is performed without dialing the predetermined number, the on-hook detecting circuit 25a detects this on-hook (in step S29). Upon receipt of the signal from the on-hook detecting circuit 25a, the control circuit 21 supplies instructions to the connecting switch changing circuit 23 to open the connection switch 26a, thereby releasing connection between the telephone set 3a and the telephone line 11 (in step S30) and closing the connection switch 26b of the facsimile 4a to the side of the ringing signal transmitting circuit 27 (in step S31). The closing of the connection switch 26b of the facsimile 4a is previously registered in the control circuit 21 by the user.

Then, a fourth timer in the timer supervising circuit 28 is started (in step S32) and the ringing signal transmitting circuit 27 is operated to transmit the ringing signal to the facsimile 4a (in step S33). The fourth timer sets a time for supervising whether the facsimile 4a responds or not and is commonly usable with the second or third timer. When the off-hook detecting circuit 24b detects a response from the facsimile 4a before a lapse of the time set in the fourth timer (in step S34), the control circuit 21 resets the fourth timer and stops the operation of the ringing signal transmitting circuit 27 (in step S35) in response to the signal from the off-hook detecting circuit 24b.

Then, the control circuit 21 transmits instructions to the connecting switch changing circuit 23 to connect the connection switch 26b with the telephone line 11 so that communication is established through the line 11 or the line 11 is rendered busy (in step S36). Upon receipt of detecting the on-hook after termination of the communication by the on-hook detecting circuit 25b (in step S37), the control circuit 21 transmits, in response to the signal from this on-hook detecting circuit 25b, instructions to the connecting switch changing circuit 23 to open the connection switch 26b, thereby releasing connection between the facsimile 4a and the telephone line 11 (in step S38) and transmits instructions to the loop closing circuit 22b to open a loop, thereby disconnecting the line connection between the plural terminals communication controlling system 2 and the telephone line 11 (in step S39). When there is no response from the facsimile 4a and the time supervising circuit 28 detects a lapse of the time set in the fourth timer (in step S40), the control circuit 21 receives the signal from the timer supervising circuit 28 and stops the operation of the ringing signal transmitting circuit 27 (in step S41).

Subsequently, the control circuit 21 sends instructions to the connecting switch changing circuit 23 to open the connection switch 26b, thereby releasing the connection between the facsimile 4a and the ringing signal transmitting circuit 27 (in step S42), and sends instructions to the loop closing circuit 22b to open a loop, thereby disconnecting the line connection between the plural terminals communication controlling system 2 and the telephone line 11 (in step S43).

According to the above construction where the second communication terminal (for example, facsimile) is called when an off-hook is performed without dialing the predetermined number, the facsimile may be called after off-hook of the automatically answering telephone set even if the selection signal cannot be received and the automatically answering telephone set is connected.

As can be seen from the foregoing, in the case where the desired communication terminal of the transmission side is the facsimile 4a, connection with the facsimile 4a is performed even if the transmission side has no selection signal transmitting circuit or even if the connection is performed with the telephone set or the automatically answering telephone set since no selection signal is received.

When there is no response from the telephone set 3a and the time supervising circuit 28 detects the lapse of time set in the third timer (in step S44), the control circuit 21 stops the operation of the ringing signal transmitting circuit 27 upon receipt of the signal from the time supervising circuit 28 (in step S45), and transmits instructions to the connecting switch changing circuit 23 to open the connection switch 26a, thereby releasing connection between the telephone 3a and the ringing signal transmitting circuit 27 (in step S30).

Although the first to fourth timers are equipped in the time supervising circuit 28 according to the embodiment as explained above, it should be understood that they may be equipped in the control circuit 21 and the time values of the first to fourth timers may arbitrarily be set.

Moreover, the present invention is so constructed that in the case where the selection signal specifying the communication terminal cannot be received within the predetermined period of time and the other predetermined communication terminal is called, when there is no response from this communication terminal, the other predetermined communication terminal is called after the lapse of the predetermined time. Thus, even if, for example, the desired communication terminal of the transmission side is a facsimile machine and the like, and a telephone set of an absent party is first called, then, the facsimile and the like may be called after the lapse of the predetermined time. Similar operations are performed in the case where the desired communication terminal of the transmission side is a data terminal.

Furthermore, even when the selection signal has not been received and there is a response from the called communication terminal, which is a telephone set or an automatically answering telephone set, a second communication terminal can be called simply by the on-hooking unless the desired communication terminal of the transmission side is this telephone set or automatically answering telephone set. It is to be noted that when the selection signal has not been received and the called communication terminal is the desired communication terminal of the transmission side, the line connection may be disconnected without any further unnecessary call of the second communication terminal by on-hooking upon the predetermined number dialing after the termination of the communication.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A plural terminals communication controlling system comprising:
   a plurality of first ports, each for accomodating each of a plurality of communication terminal equipment;
   a second port for accommodating a single telephone line;
   means for closing a loop to temporarily respond to a transmission side in response to a signal indicative of an incoming call;
   first supervising means for supervising whether a selection signal is transmitted from said transmission side within a first predetermined supervising period of time after the temporary response;
   first calling means for calling a first communication terminal equipment when said selection signal from said transmission side is not received within said first predetermined supervising period of time;
   second supervising means for supervising whether the first communication terminal equipment called by said first calling means responds within a second predetermined supervising period of time;
   changing means for switching to a second communication terminal equipment from said first communication terminal equipment when said first communication terminal equipment called by said first calling means does not respond to the call from said first calling means within said second predetermined supervising period of time;
   second calling means for calling a communication terminal equipment specified by said selection signal when said selection signal from said transmission side is received within said first predetermined supervising period of time;
   third supervising means for supervising whether the communication terminal equipment called by said second calling means responds to the call from said second calling means within a third predetermined supervising period of time;
   means for disconnecting said telephone line when no communication terminal equipment called by said first or second calling means responds to the call from said first or second calling means within said first or second predetermined supervising period of time; and
   means for connecting the first port which accommodates the communication terminal equipment called by said first or second calling means to said second port when said communication terminal equipment called by said first or second calling means responds to the call from said first or second calling means.

2. A plural terminals communication controlling system as claimed in claim 1, further comprising: first detecting means for detecting on-hook of said communication terminal equipment responding to the call from said first calling means; said changing means switching the call to the second communication terminal equipment when the on-hook is detected by said first detecting means.

3. A plural terminals communication controlling system as claimed in claim 2, further comprising:
   second detecting means for detecting on-hook of the communication terminal equipment responding to the call from said first calling means after a predetermined number is dialed; and
   means for disconnecting said telephone line when the on-hook is detected by said second detecting means.

4. A plural terminals communication controlling system as claimed in claim 2, further comprising:
   second detecting means for detecting on-hook of the communication terminal equipment responding to the call from said second calling means after a predetermined number is dialed; and
   means for disconnecting said telephone line when the on-hook is detected by said second detecting means.

* * * * *